US009169866B2

(12) United States Patent
Sato et al.

(10) Patent No.: US 9,169,866 B2
(45) Date of Patent: Oct. 27, 2015

(54) TILTING PAD BEARING

(71) Applicant: Mitsubishi Hitachi Power Systems, Ltd., Yokohama, Kanagawa (JP)

(72) Inventors: Motoki Sato, Tokyo (JP); Kenta Suzuki, Tokyo (JP); Makoto Hemmi, Tokyo (JP); Tomoaki Inoue, Tokyo (JP); Kenichi Murata, Yokohama (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 0 days.

(21) Appl. No.: 14/314,218

(22) Filed: Jun. 25, 2014

(65) Prior Publication Data

US 2015/0003762 A1     Jan. 1, 2015

(30) Foreign Application Priority Data

Jun. 26, 2013   (JP) ................................. 2013-133418

(51) Int. Cl.
| *F16C 17/06* | (2006.01) |
| *F16C 17/04* | (2006.01) |
| *F16C 37/00* | (2006.01) |
| *F16C 17/03* | (2006.01) |

(52) U.S. Cl.
CPC ................. *F16C 17/06* (2013.01); *F16C 17/03* (2013.01); *F16C 17/045* (2013.01); *F16C 37/002* (2013.01)

(58) Field of Classification Search
CPC .......... F16C 17/03; F16C 17/04; F16C 17/06; F16C 17/26; F16C 32/0666; F16C 33/1065; F16C 37/002; F16C 17/045
USPC ........................... 384/112, 117, 122, 306–312
See application file for complete search history.

(56) References Cited

U.S. PATENT DOCUMENTS

| 1,900,924 | A | * | 3/1933 | Firth ............................... 384/305 |
| 2,507,021 | A | * | 5/1950 | Lakey ............................ 384/307 |
| 2,871,070 | A |   | 1/1959 | Dunn |
| 3,891,281 | A | * | 6/1975 | Jenness ........................ 384/306 |
| 4,501,505 | A | * | 2/1985 | Chambers ..................... 384/152 |
| 4,568,204 | A |   | 2/1986 | Chambers |
| 4,714,357 | A | * | 12/1987 | Groth et al. ................... 384/312 |
| 5,007,745 | A | * | 4/1991 | Ball et al. ...................... 384/307 |
| 5,288,153 | A | * | 2/1994 | Gardner ........................ 384/311 |
| 5,547,287 | A | * | 8/1996 | Zeidan .......................... 384/117 |

(Continued)

FOREIGN PATENT DOCUMENTS

| GB | 614724 A | 12/1948 |
| JP | 5-36646 A | 2/1993 |

OTHER PUBLICATIONS

European Search Report dated Nov. 11, 2014 (five pages).

*Primary Examiner* — Marcus Charles
(74) *Attorney, Agent, or Firm* — Crowell & Moring LLP

(57) ABSTRACT

A tilting pad bearing is provided that can reduce an amount of oil leaking from the side edges of a sliding surface of a pad, thereby reducing an amount of oil to be fed onto the sliding surface of the pad. The tilting pad bearing includes journal pads arranged in a circumferential direction of a rotating shaft, and a bearing housing for carrying the journal pads in a tiltable manner via associated pivots. Lubricating oil is fed to a sliding surface of the journal pad via an oil-feeding hole formed in the journal pad. The sliding surface of the journal pad has a portion formed so that the portion has an axial width that gradually increases, as the axial width approaches the circumferential downstream side of the rotating shaft, from an oil-feed start position.

6 Claims, 13 Drawing Sheets

(56) References Cited

U.S. PATENT DOCUMENTS

| | | | |
|---|---|---|---|
| 5,702,186 A * | 12/1997 | Hackstie et al. | 384/117 |
| 5,720,558 A | 2/1998 | Edney et al. | |
| 5,772,335 A * | 6/1998 | Miller | 384/309 |
| 5,795,076 A * | 8/1998 | Ball et al. | 384/307 |
| 6,089,754 A * | 7/2000 | Wilkes et al. | 384/122 |
| 6,200,034 B1 * | 3/2001 | Miller | 384/117 |
| 6,499,883 B2 * | 12/2002 | Miller | 384/117 |
| 6,592,490 B2 * | 7/2003 | Olson | 384/123 |
| 6,739,756 B2 * | 5/2004 | Miller | 384/117 |
| 2002/0110295 A1 | 8/2002 | Miller | |

\* cited by examiner

TILTING PAD BEARING

BACKGROUND OF THE INVENTION

1. Field of the Invention

The present invention relates to a tilting pad bearing.

2. Description of the Related Art

A slide bearing is a bearing that carries a rotating shaft via a thin fluid film. Such a slide bearing exhibits higher withstand load performance in comparison with a rolling bearing and is also superior in vibration damping and impact resistance. For this reason, slide bearings are widely employed for industrial large machinery such as steam turbines and generators which need to provide high reliability. As one of the slide bearings used for such industrial large machinery, tilting pad bearings are known in the art which is superior in vibrational stability.

A tilting pad bearing includes a plurality of pads arranged in a circumferential direction of a rotating shaft, and a bearing housing which carries the plurality of pads via a plurality of pivots in a tiltable manner. Lubricating oil is fed between the rotating shaft and sliding surfaces of the pads to form oil films therebetween, with the pressure by the oil film carrying the rotating shaft. In this case, the tilt of the pad varies according to the pressure distribution of the oil film, which can suppress unstable vibration such as oil-whip.

The provision of the tilting pad bearings are generally based on an oil bath method or a direct feed method. In the oil bath method, the seal performance of a bearing chamber in which to house pads is enhanced and lubricating oil is stored in the bearing chamber. With this, the lubricating oil is adapted to be fed between a rotating shaft and sliding surfaces of the pads. If the oil bath method is adopted, however, part of the lubricating oil heated to high temperature by heat generation due to shearing will stay in the bearing chamber. In such a case the metal temperature of the pad may rise.

On the other hand, the direct feed method allows lubricating oil to be fed between a rotating shaft and sliding surfaces of pads via an oil-feeding hole formed in the pad (see e.g. JP-5-36646-B). In this method, since low-temperature lubricating oil is directly fed between the rotating shaft and the sliding surfaces of the pads, a rise in the metal temperature of the pad can be suppressed. In addition, an amount of lubricating oil fed thereto can be reduced.

SUMMARY OF THE INVENTION

In the tilting pad bearing (the journal bearing) of a direct feed method described in JP-5-36646-B, the sliding surface of a pad is formed such that the sliding surface has an axial width that is constant from a circumferential upstream leading edge to a circumferential downstream trailing edge with the exception of a portion formed with an oil-feeding hole positioned circumferentially. In other words, the sliding surface of the journal pad is formed so that the sliding surface has the axial width that is constant from an oil-feed start position at which lubrication oil is to be fed onto the sliding surface from the oil-feeding hole, to the circumferential downstream trailing edge. Therefore, the lubricating oil fed to the sliding surface of the pad from the oil-feeding hole partially flows toward the trailing edge of the sliding surface, and the residual lubrication oil flows toward the side edges of the sliding surface and leaks therefrom. More specifically, the pad tilts as described above; therefore, the thickness of an oil film formed between a rotating shaft and the sliding surface of the pad (i.e., a clearance between the rotating shaft and the sliding surface of the pad) gradually decreases as the thickness approaches the circumferential downstream side of the rotating shaft. Accordingly, if the sliding surface of the pad has a width constant in axial direction as describe above, the sectional area of the oil film formed between the rotating shaft and the sliding surface of the pad (i.e., a sectional area of the gap defined between the rotating shaft and the sliding surface of the pad) is reduced as the sectional area approaches the circumferential downstream side of the rotating shaft. According to the decrease in the sectional area of the oil film, oil leaks from the side edges of the pad. Therefore, since the amount of oil leaking from the side edges of the sliding surface of the pad is not small, the amount of oil to be fed onto the sliding surface of the pad from the oil-feeding hole has to be more increased with consideration for the amount of leaking oil.

It is an object of the present invention to provide a tilting pad bearing that can reduce an amount of oil leaking from the side edges of a sliding surface of a pad, thereby reducing an amount of oil to be fed onto the sliding surface of the pad.

To accomplish the above object, according to an aspect of the present invention, there is provided a tilting pad bearing, comprising a plurality of journal pads arranged in a circumferential direction of a rotating shaft so as to face an outer circumferential surface of the rotating shaft; and a bearing housing for carrying the plurality of journal pads in a tiltable manner via a plurality of pivots; wherein lubricating oil is fed to a sliding surface of each of the journal pads via an oil-feeding hole formed in at least one of the journal pads or via an oil-feed nozzle disposed between at least a pair of the journal pads adjacent to each other; and wherein the sliding surface of each of the journal pads includes a portion so formed that the sliding surface has an axial width that gradually increases from an oil-feed start position to feed the lubricating oil from the oil-feeding hole or the oil-feed nozzle onto the sliding surface as the axial width approaches the circumferential downstream side of the rotating shaft.

With such a configuration, the sectional area of an oil film formed between the outer circumferential surface of the rotating shaft and the sliding surface of each of the journal pads (i.e., the sectional area of the clearance therebetween) does not gradually decrease, as the sectional area approaches the circumferential downstream side of the rotating shaft, from the oil-feed start position or such a decrease can be suppressed. Therefore, an amount of oil leaking from the side edges of the sliding surface of the pad can be reduced, which makes it possible to reduce the amount of oil to be fed onto the sliding surface of the pad.

According to another aspect of the present invention, there is provided a tilting pad bearing, comprising: a plurality of thrust pads arranged in a circumferential direction of a rotating shaft so as to face a runner portion of the rotating shaft; and a bearing housing for carrying the plurality of thrust pads in a tiltable manner via a plurality of pivots; wherein lubricating oil is fed to a sliding surface of each of the thrust pads via an oil-feeding hole formed in at least one of the journal pads or via an oil-feed nozzle disposed between at least a pair of the journal pads adjacent to each other; and wherein the sliding surface of each of the thrust pads includes a portion so formed that the sliding surface has an radial width that gradually increases from an oil-feed start position to feed the lubricating oil from the oil-feeding hole or the oil-feed nozzle onto the sliding surface as the radial width approaches the circumferential downstream side of the rotating shaft.

With such a configuration, the sectional area of an oil film formed between the runner portion of the rotating shaft and the sliding surface of each of the thrust pads (i.e., the sectional area of the clearance therebetween) does not gradually decrease, as the sectional area approaches the circumferential downstream side of the rotating shaft, from the oil-feed start position or such a decrease can be suppressed. Therefore, an amount of oil leaking from the side edges of the sliding surface of the pad can be reduced, which makes it possible to reduce the amount of oil to be fed onto the sliding surface of the pads.

DESCRIPTION OF THE PREFERRED EMBODIMENTS

A first embodiment of the present invention will be described with reference to the drawings.

Figure 1:
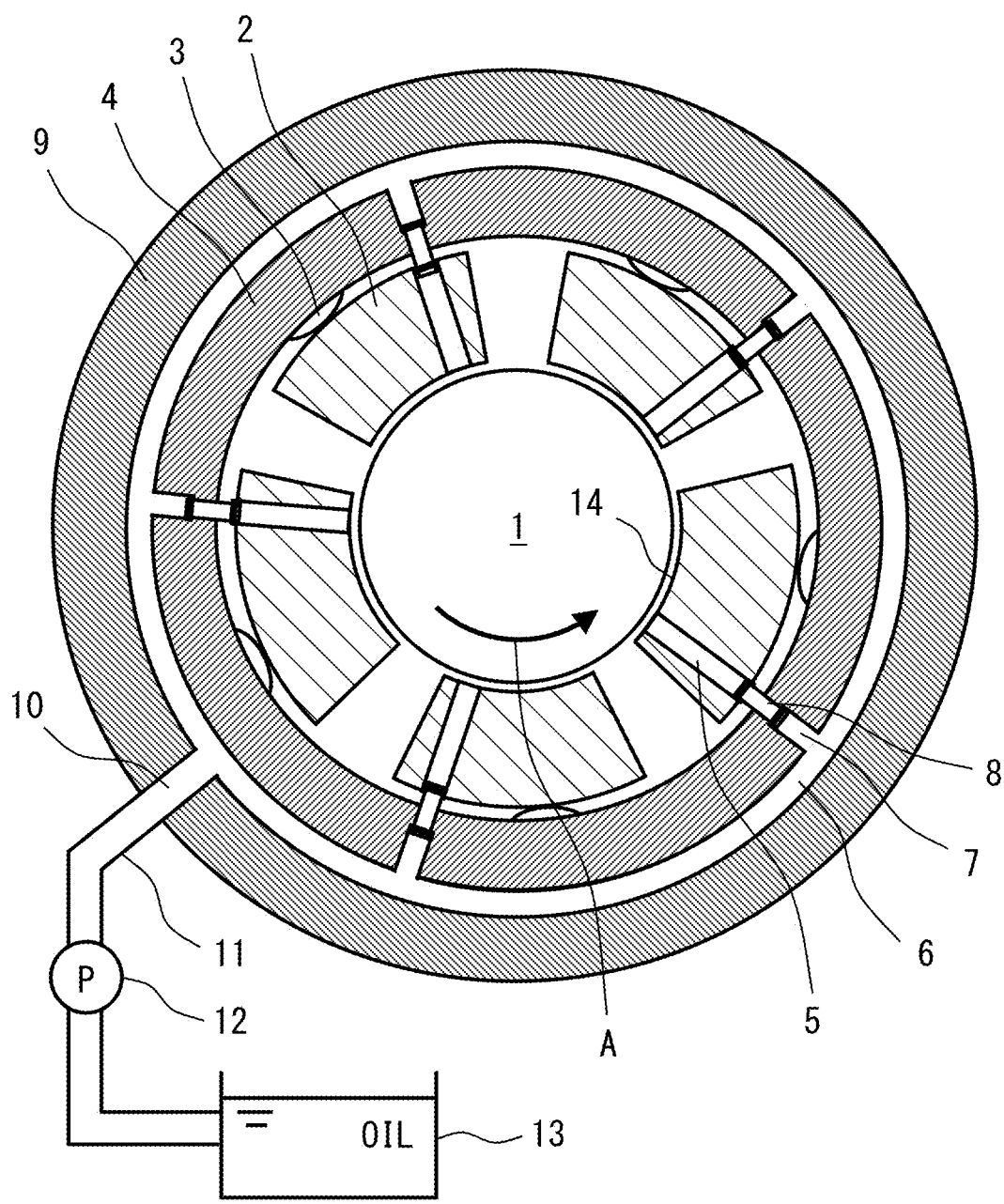
FIG. 1 is a circumferential cross-sectional view illustrating a structure of a tilting pad bearing according to a first embodiment of the present invention.
Figure 2:
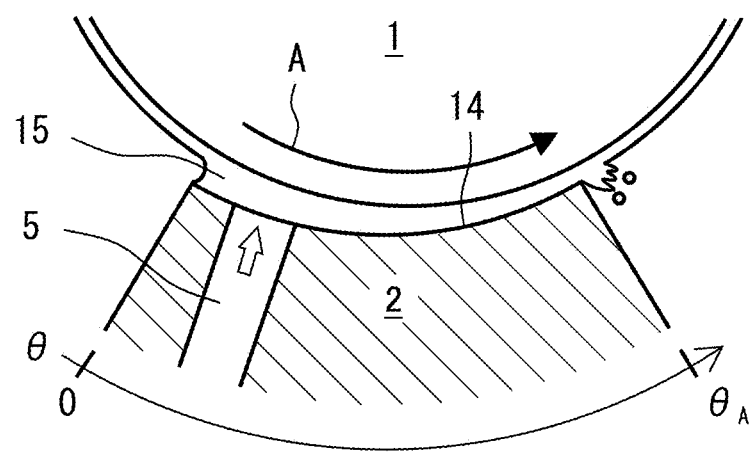
FIG. 2 is a circumferential cross-sectional view illustrating an oil film formed between an outer circumferential surface of a rotating shaft and a sliding surface of a journal pad according to the first embodiment of the present invention.
Figure 3:
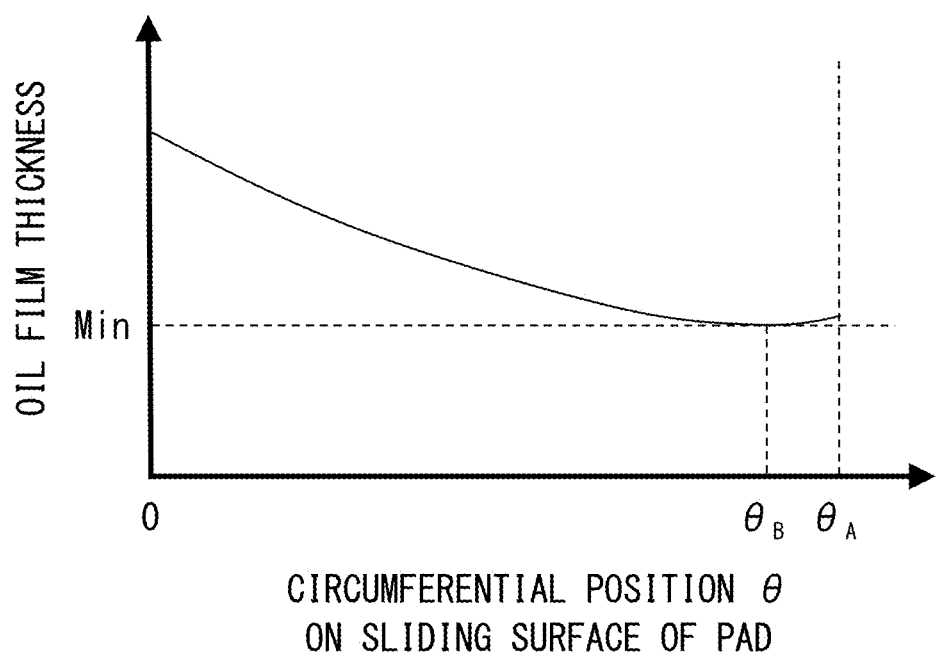
FIG. 3 is a diagram showing a variation in the thickness of the oil film formed between the outer circumferential surface of the rotating shaft and the sliding surface of the journal pad according to the first embodiment of the present invention.
Figure 4:
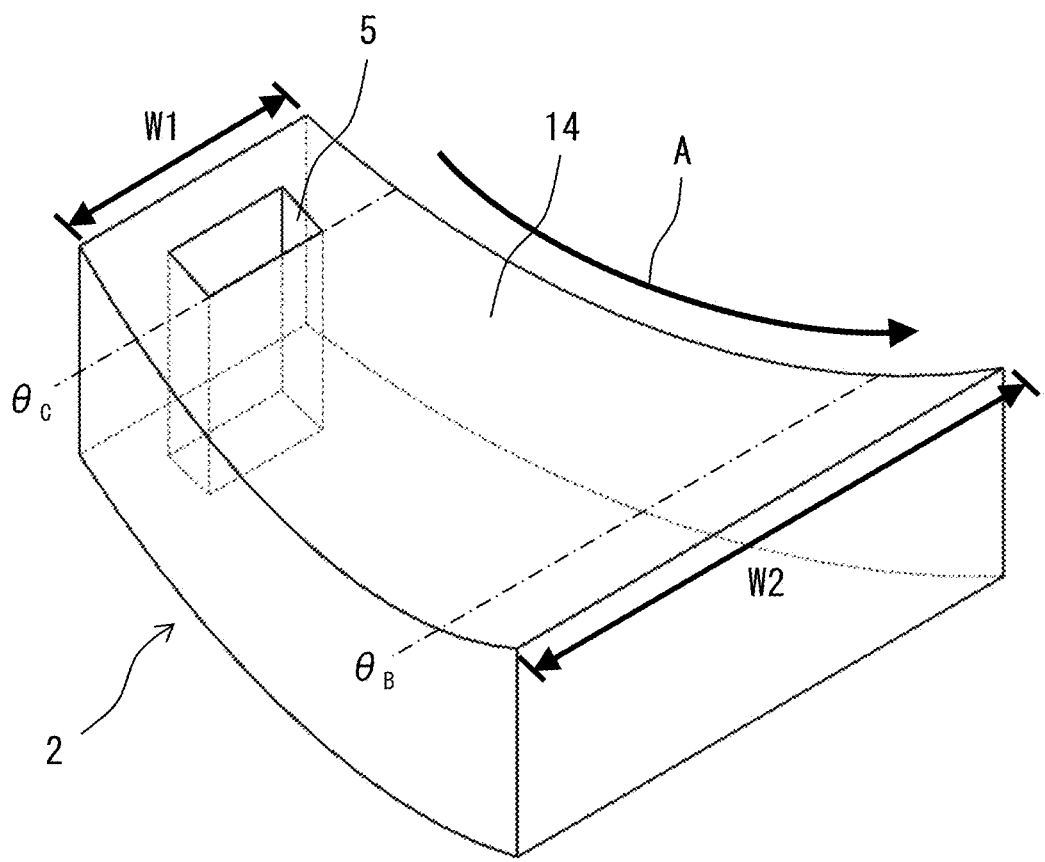
FIG. 4 is a perspective view illustrating a structure of the journal pad according to the first embodiment of the present invention.

FIG. 1 is a circumferential cross-sectional view illustrating a structure of a tilting pad bearing according to the first embodiment. FIG. 2 is a circumferential cross-sectional view illustrating an oil film formed between an outer circumferential surface of a rotating shaft and a sliding surface of a journal pad according to the present embodiment. FIG. 3 is a diagram showing a variation in the thickness of the oil film. FIG. 4 is a perspective view illustrating a structure of the journal pad according to the present embodiment.

The tilting pad bearing of the present embodiment is a journal bearing which carries the radial load of the rotating shaft 1. This tilting pad bearing includes a plurality of journal pads 2 and a bearing housing 4. The journal pads 2 are disposed in the circumferential direction of the rotating shaft 1 so as to face the outer circumference of the rotating shaft 1. The bearing housing 4 carries the plurality of journal pads 2 in a tiltable manner via a plurality of associated pivots 3.

Each journal pad 2 has a front end portion (i.e., a circumferentially upstream end portion) formed with an oil-feeding hole 5 which radially passes therethrough. An oil-leading groove 6 extending in the circumferential direction is formed on the outer circumferential side of the bearing housing 4. The bearing housing 4 is formed with oil-leading holes 7 which radially pass therethrough from the oil-leading groove 6 so as to correspond to the associated oil-feeding holes 5 of the respective journal pads 2. The oil-leading hole 7 of the bearing housing 4 and the oil-feeding hole 5 of the journal pad 2 are connected to each other via an extensible or flexible oil-leading tube 8. The oil-leading groove 6 of the bearing housing 4 is connected to an oil tank 13 via an oil-leading hole 10 of a casing 9, piping 11 and a pump 12. The pump 12 is driven to feed lubricating oil stored in the oil tank 13 to the oil-leading groove 6 of the bearing housing 4 and further to the sliding surface 14 of the journal pad 2 via the oil-leading hole 7 of the bearing housing 4, the oil-leading tube 8 and the oil-feeding hole 5 of the journal pad 2.

The lubricating oil fed between the outer circumferential surface of the rotating shaft 1 and the sliding surface 14 of the journal pad 2 is rotated along with the rotating shaft 1 to form an oil film 15. The pressure of the oil film 15 carries the rotating shaft 1. In this case, the journal pad 2 is tilted according to the pressure distribution of the oil film 15. Therefore, the thickness of the oil film formed between the outer circumferential surface of the rotating shaft 1 and the sliding surface 14 of the journal pad 2 gradually decreases, as the thickness approaches the circumferential downstream side of the rotating shaft, (i.e., in the rotational direction of the rotating shaft 1 indicated by arrow A in the figures). More specifically, as shown in FIG. 3, the thickness of the oil film becomes a maximum value at the leading edge (a circumferential position $\theta=0$) of the sliding surface 14 of the journal pad 2. The thickness of the oil film gradually decreases as the thickness approaches the circumferential downstream side of the rotating shaft, and reaches a minimum value at a circumferential position $\theta=\theta_B$. Further, the thickness of the oil film slightly increases as the thickness approaches the trailing edge (a circumferential position $\theta=\theta_A$) of the sliding surface 14.

As illustrated in FIG. 4, the sliding surface 14 of the journal pad 2 of the present embodiment has the axial width of W1 at the leading edge and the axial width of W2 at the trailing edge, which is greater than W1. (In short, W2>W1) The sliding surface 14 of the journal pad 2 is formed such that the sliding surface has the axial width that gradually increases, as the axial width approaches the circumferential downstream side of the rotating shaft, from the leading edge to the trailing edge with the exception of the portion formed with the oil-feeding hole 5 positioned circumferentially. In other words, the sliding surface 14 of the journal pad 2 has a portion so formed that the sliding surface has the axial width that gradually increases from an oil-feed start position (a circumferential position $\theta=\theta_C$) to feed the lubrication oil from the oil-feeding hole 5 onto the sliding surface 14 as the axial width approaches the circumferential downstream side of the rotating shaft. Incidentally, FIG. 6 described later illustrates a case where the axial width increases in a linear manner. However, the present invention is not limited to this. The axial width may be formed to increase in a curved manner. The function and effect of the present embodiment configured as above will be described in comparison with the conventional technology.

Figure 5:
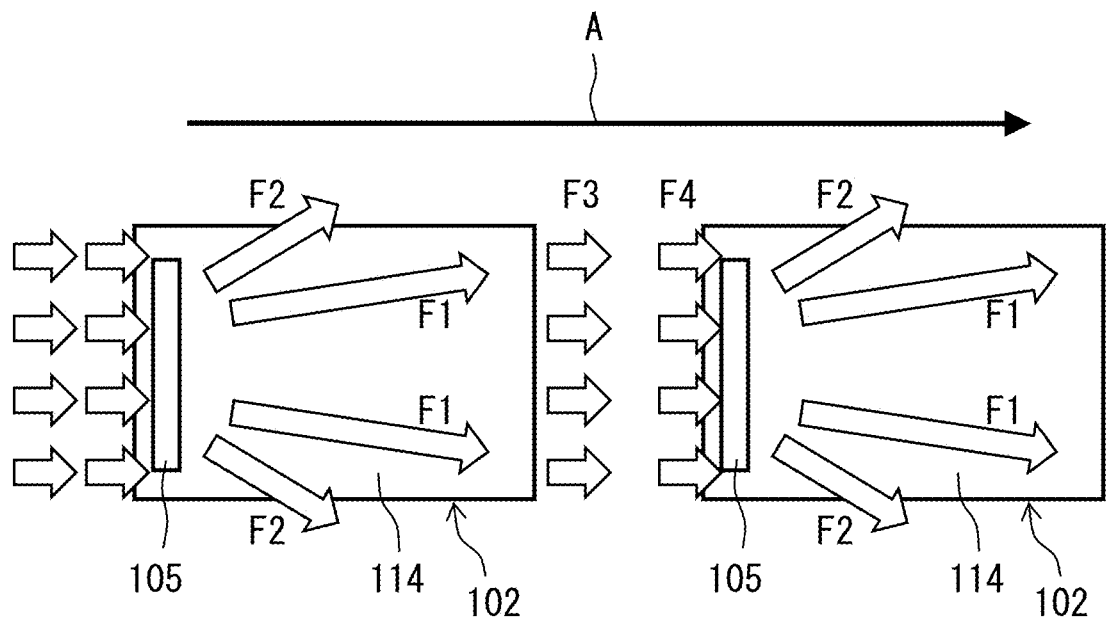
FIG. 5 is a sliding surface development diagram illustrating the flow of oil on the sliding surface of the journal pad in a conventional technology.
Figure 6:
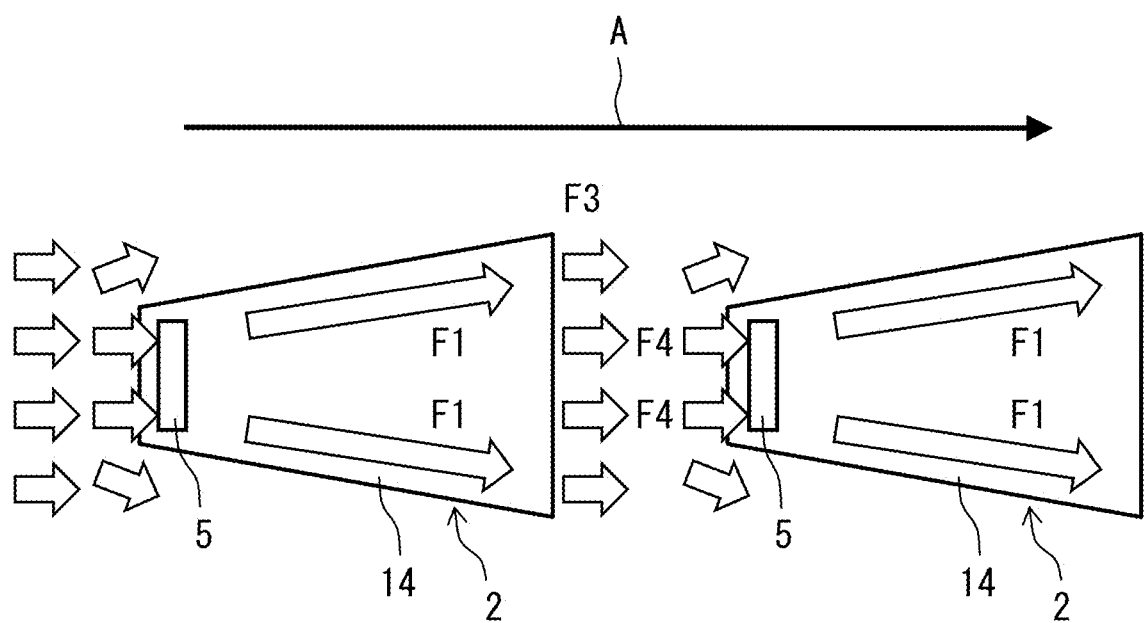
FIG. 6 is a sliding surface development diagram illustrating the flow of oil on the sliding surface of the journal pad according to the first embodiment.
Figure 7:
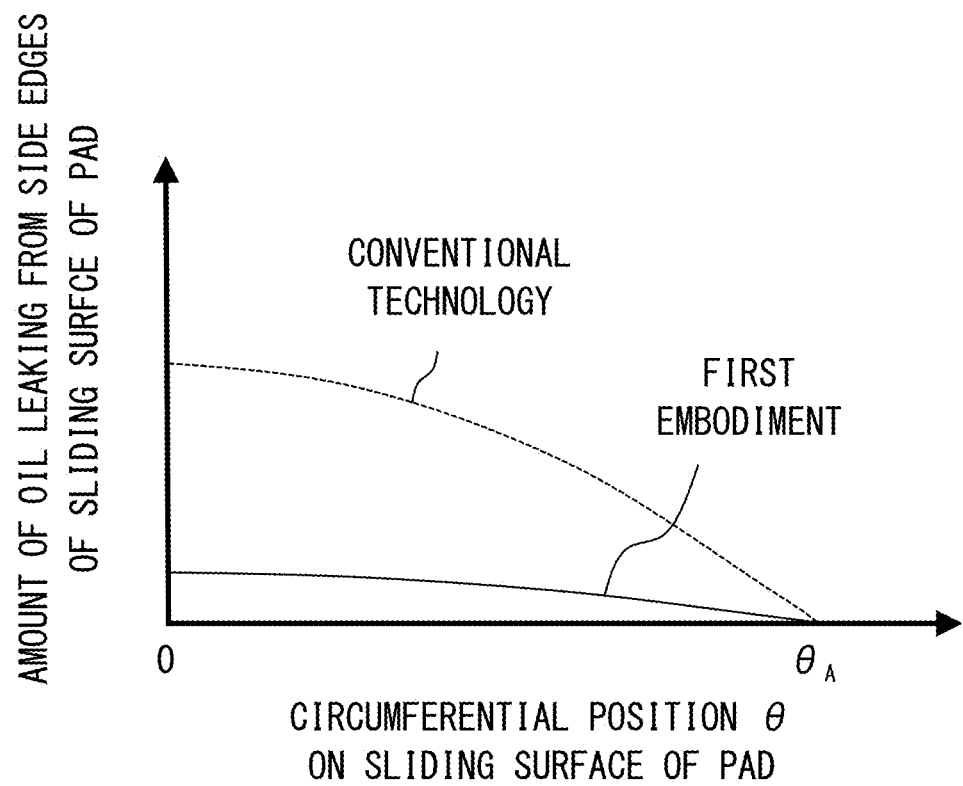
FIG. 7 shows amounts of oil leaking from the side edges of the sliding surface of the pad according to the conventional technology and to the first embodiment of the present invention.

FIG. 5 is a sliding surface development diagram illustrating the flow of oil on a sliding surface 114 of a journal pad 102 in the conventional technology. FIG. 6 is a sliding surface development diagram illustrating the flow of oil on the sliding surface 14 of the journal pad 2 according to the present embodiment. FIG. 7 shows amounts of oil leaking from the side edges of the sliding surface of the pad according to the conventional technology and the present embodiment.

The sliding surface 114 of the journal pad 102 of the conventional technology are formed such that the sliding surface has an axial width that is constant (e.g. W2) from the leading edge to the trailing edge with the exception of the portion formed with oil-feeding hole 105 positioned circumferentially. In other words, the sliding surface 114 of the journal pad 102 is formed such that the sliding surface has the axial width that is constant from an oil-feed start position at which oil is to be fed onto the sliding surface 114 from the oil-feeding hole 105, to the circumferential downstream side of the rotating shaft. Lubricating oil fed to the sliding surface 114 of the pad 102 from the oil-feeding hole partially flows toward the trailing edge of the sliding surface 114 as indicated by arrows F1 in FIG. 5. However, the residual lubricating oil flows toward the side edges of the sliding surface 114 and leaks therefrom as indicated by arrows F2 in FIG. 5. More specifically, since the thickness of an oil film gradually decreases as the thickness approaches the circumferential downstream side of the rotating shaft as illustrated in FIG. 3 described above, the sectional area of the oil film also gradually decreases as the sectional area approaches the circumferential downstream side of the rotating shaft. The oil leaks from the side edges of the sliding surface 114 of the pad 102 in accordance with the decrease in the sectional area of the oil film. Thus, since the amount of oil leaking from the side edges of the sliding surface 114 of the pad 102 is not small as shown in FIG. 7, an amount of oil to be fed onto the sliding surface 114 of the pad 102 has to be increased in terms of this amount of leaking oil.

On the other hand, the sliding surface 14 of the journal pad 12 of the present embodiment is formed such that the sliding surface has the axial width that gradually increases, as the axial width approaches the circumferential downstream side of the rotating shaft, from the leading edge to the trailing edge with the exception of the portion formed with the oil-feeding hole 5 positioned circumferentially. In other words, the sliding surface 14 of the journal pad 2 has a portion so formed that the sliding surface has the axial width that gradually increases from the oil-feed start position to feed the lubrication oil from the oil-feeding hole 5 onto the sliding surface 14 as the axial width approaches the circumferential downstream side of the rotating shaft. In this way, the cross-sectional area of the oil film does not decrease as the axial width approaches the circumferential downstream side of the rotating shaft, or a decrease in the cross-sectional area of the oil film can be suppressed. Thus, the amount of oil leaking from the side edges of the sliding surface 14 of the pad 2 can be reduced. That is to say, most of the lubrication oil fed to the sliding surface 14 of the pad 2 from the oil-feeding hole 5 flows toward the trailing edge of the sliding surface 14 as indicated by arrows F1 in FIG. 6. Thus, while providing an intended oil film pressure, an amount of oil to be fed onto the sliding surface 14 of the pad 2 can be reduced.

The sliding surface 114 of the journal pad 102 of the conventional technology has the axial width of the leading edge that is the same as that of the trailing edge. Of high-temperature lubricating oil (see arrows F3 in FIG. 5) flowing out from the trailing edge of the sliding surface 114 of one journal pad 102, a proportion of the lubricating oil (see arrows F4 in FIG. 5) flowing into the leading edge of the sliding surface 114 of the other journal pad 102 is relatively large. Therefore, the temperature of the sliding surface 114 of the pad 102 tends to rise. Thus, an amount of oil fed to the sliding surface 114 from the oil-feeding hole 105 has to be increased.

In contrast, the sliding surface 14 of the journal pad 2 of the present embodiment has the axial width W1 at the leading edge, which is smaller than the axial width W2 at the trailing edge. Therefore, of the high-temperature lubricating oil (see arrows F3 in FIG. 6) flowing out from the trailing edge of the sliding surface 14 of one journal pad 2, a proportion of lubricating oil (see arrows F4 in FIG. 6) flowing into the leading edge of the sliding surface 14 of the other journal pad 2 is relatively small. Therefore, a rise in temperature of the sliding surface 14 of the pad 2 can be suppressed. Thus, an amount of oil to be fed onto the sliding surface 14 from the oil-feeding hole 5 can be reduced.

Incidentally, the above first embodiment describes by way of example the case where the sliding surface 14 of the journal pad 2 is formed such that the sliding surface has the axial width that gradually increases, as the axial width approaches the circumferential downstream side of the rotating shaft, from the leading edge to the trailing edge with the exception of the portion formed with the oil-feeding hole 5 positioned circumferentially. However, the present invention is not limited to this. The first embodiment can be modified within a range not departing from the gist and technical concept of the present invention. That is to say, the sliding surface of the journal pad needs only to have a portion so formed that the sliding surface has the axial width that gradually increases from the oil-feed start portion (the circumferential position $\theta=\theta_C$) to feed the lubricating oil from the oil-feeding hole onto the sliding surface as the axial width approaches the circumferential downstream side of the rotating shaft. Therefore, for example, even if the portion formed with the oil-feeding hole positioned circumferentially is excluded, the axial width does not need to increase, as the axial width approaches the circumferential downstream side of the rotating shaft, from the leading edge to the oil-feed start position. For example, the sliding surface 14 of the journal pad 2 may be formed so that the sliding surface has the axial width that gradually increases from the oil-feed start position (the circumferential position $\theta=\theta_B$) to the position at which the thickness of the oil film reaches the minimum value, as the axial width approaches the circumferential downstream side of the rotating shaft (in other words, the axial width may not increase from the position at which the thickness of the oil film reaches the minimum value, to the trailing edge). Although the effect of reducing the amount of leaking oil reduces, the sliding surface of the journal pad may be formed so that the sliding surface has the axial width that becomes the maximum at a position (however, preferably a position on the circumferentially downstream side of the middle between the leading edge and the trailing edge) on the circumferential upstream side of the position at which the thickness of the oil film reaches the minimum value. Even these modified examples can reduce the amount of oil leaking from the side edges of the sliding surface of the pad, which makes it possible to reduce the amount of oil to be fed onto the sliding surface of the pad as compared with the conventional technology.

Figure 8:
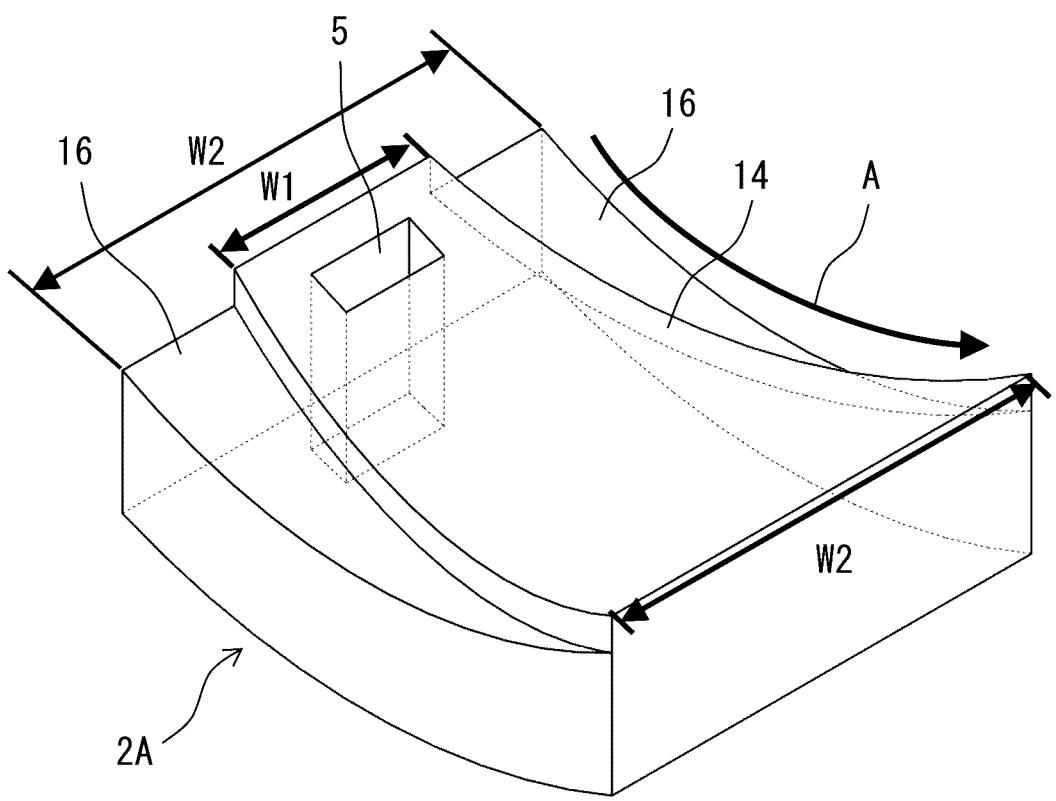
FIG. 8 is a perspective view illustrating a structure of a journal pad according to a first modified example of the present invention.

The above first embodiment describes by way of example the case where the journal pad 2 is configured so that the overall axial width thereof may gradually increase, as the axial width approaches the circumferential downstream side of the rotating shaft, from the circumferentially upstream front end to the circumferentially downstream rear end. However, the present invention is not limited to this. The first embodiment can be modified within a range not departing from the gist and technical concept of the present invention. That is to say, for example, stepped surfaces 16 may be formed on both axially outsides of a sliding surface 14 of a journal pad 2A (specifically, the stepped surfaces 16 which are concaved from the sliding surface 14 so as to form no oil film between the outer circumferential surface of the rotating shaft 1 and the stepped surfaces 16) as illustrated in FIG. 8. Further, the journal pad 2A may be configured so that the overall axial width thereof including the sliding surface 14 and the stepped surfaces 16 may be constant (W2) from the circumferential upstream leading edge to the circumferential downstream trailing edge. Also such a modified example can reduce the amount of oil leaking from the side edges of the sliding surface 14 of the pad 2A. Thus, the amount of oil to be fed onto the sliding surface 14 of the pad 2A can be reduced. The modified example has a smaller clearance between the side surface of the pad 2A and a wall surface than that of the above first embodiment. Therefore, the pad 2A is hard to move in the axial direction, so that the attachment performance of the pad 2A becomes better.

The above first embodiment describes by way of example the case where all the journal pads 2 are formed with the respective oil-feeding holes 5 and lubricating oil is fed to the sliding surfaces 14 of the journal pads 2 via the associated oil-feeding holes 5. However, the present invention is not limited to this. That is to say, for example, a tilting pad bearing that carries a horizontal rotating shaft 1 may be configured such that only a journal pad 2 located on the underside of the rotating shaft 1 is formed with an oil-feeding hole 5 and lubricating oil is fed to the sliding surface of the journal pad 2 via this oil-feeding hole 5. In this case, the features of the present invention may be adopted only for the sliding surface of the journal pad 2 located on the underside of the rotating shaft 1. Also such a modified example can produce the same effects as above.

Figure 9:
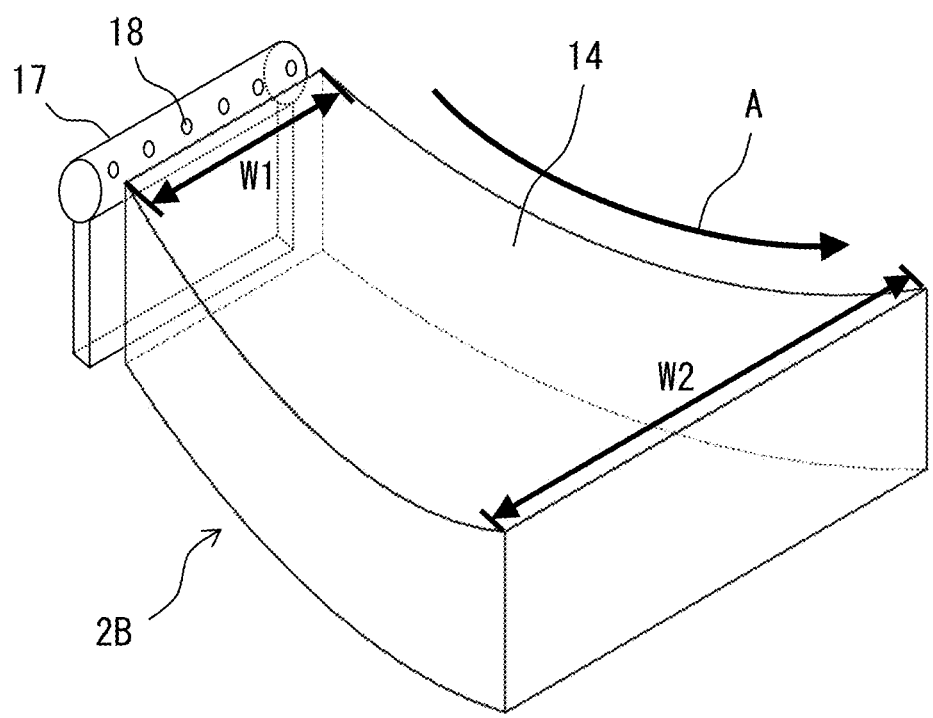
FIG. 9 is a perspective view illustrating a structure of a journal pad of a second modified example of the present invention along with an oil-feed nozzle.

The above first embodiment describes by way of example the case where lubricating oil is fed to the sliding surface 14 of the journal pad 2 via the oil-feeding hole 5 formed in the journal pad 2. However, the present invention is not limited to this. The present invention may be applied to a configuration in which lubricating oil is fed to a sliding surface 14 of a journal pad 2B via an oil-feed nozzle 17 (see FIG. 9) provided between journal pads 2B adjacent to each other. In this case, an oil-feed start position at which oil is fed to the sliding surface 14 from the oil-feed nozzle 17 corresponds to the leading edge of the sliding surface 14. Therefore, the sliding surface 14 of the journal pad 2B may have a portion so formed that the sliding surface has the axial width that gradually increases from the leading edge as the axial width approaches the circumferential downstream side of the rotating shaft. In one of specific examples, the sliding surface 14 of the journal pad 2B illustrated in FIG. 9 is formed so that the sliding surface has the axial width that gradually increases, as the axial width approaches the circumferential downstream side of the rotating shaft, from the leading edge to the trailing edge. Incidentally, jetting ports 18 of the oil-feed nozzle 17 are arranged to correspond to the axial width of the leading edge of the journal pad 2B. Also such a modified example can reduce an amount of oil leaking from the side edges of the sliding surface 14 of the pad 2B, so that the amount of oil to be fed onto the sliding surface 14 of the pad 2B can be reduced. In addition, the present modified example can increase the area of the sliding surface in accordance with the area of an oil-feeding hole not formed. Thus, stability can be enhanced.

A second embodiment of the present invention will be described with reference to the drawings.

Figure 10:
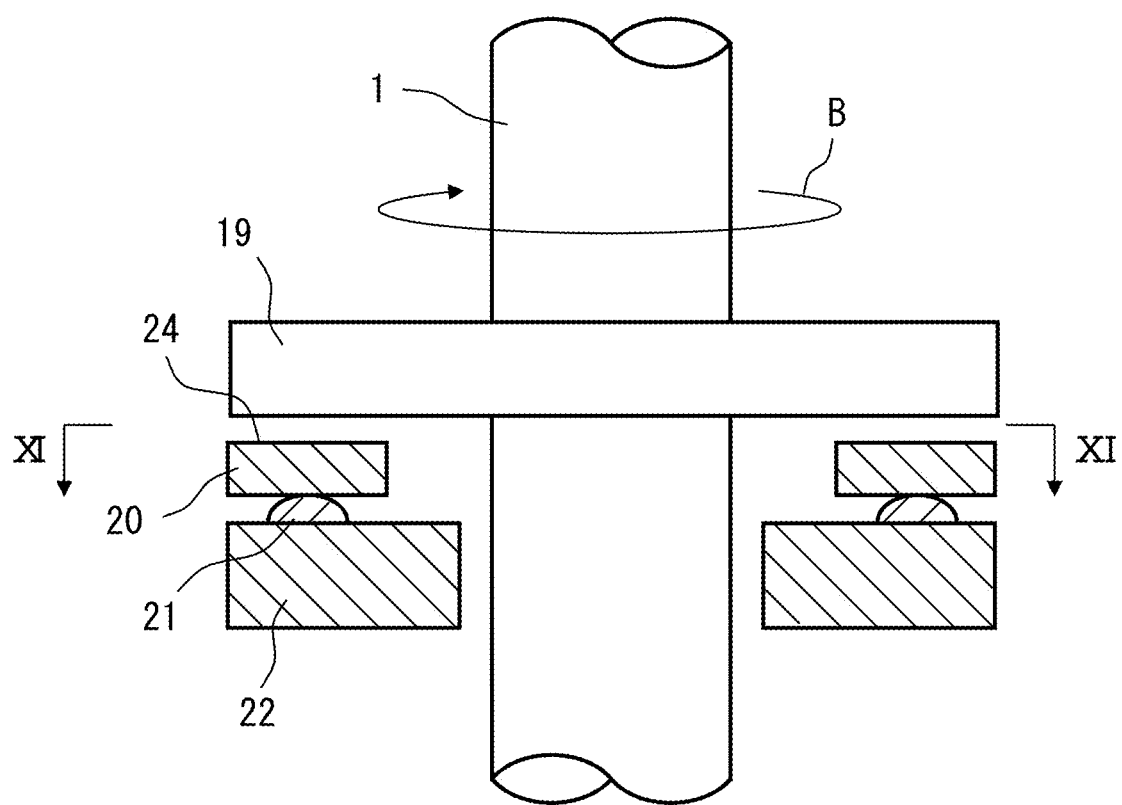
FIG. 10 is an axial cross-sectional view illustrating a structure of a tilting pad bearing according to a second embodiment of the present invention.
Figure 11:
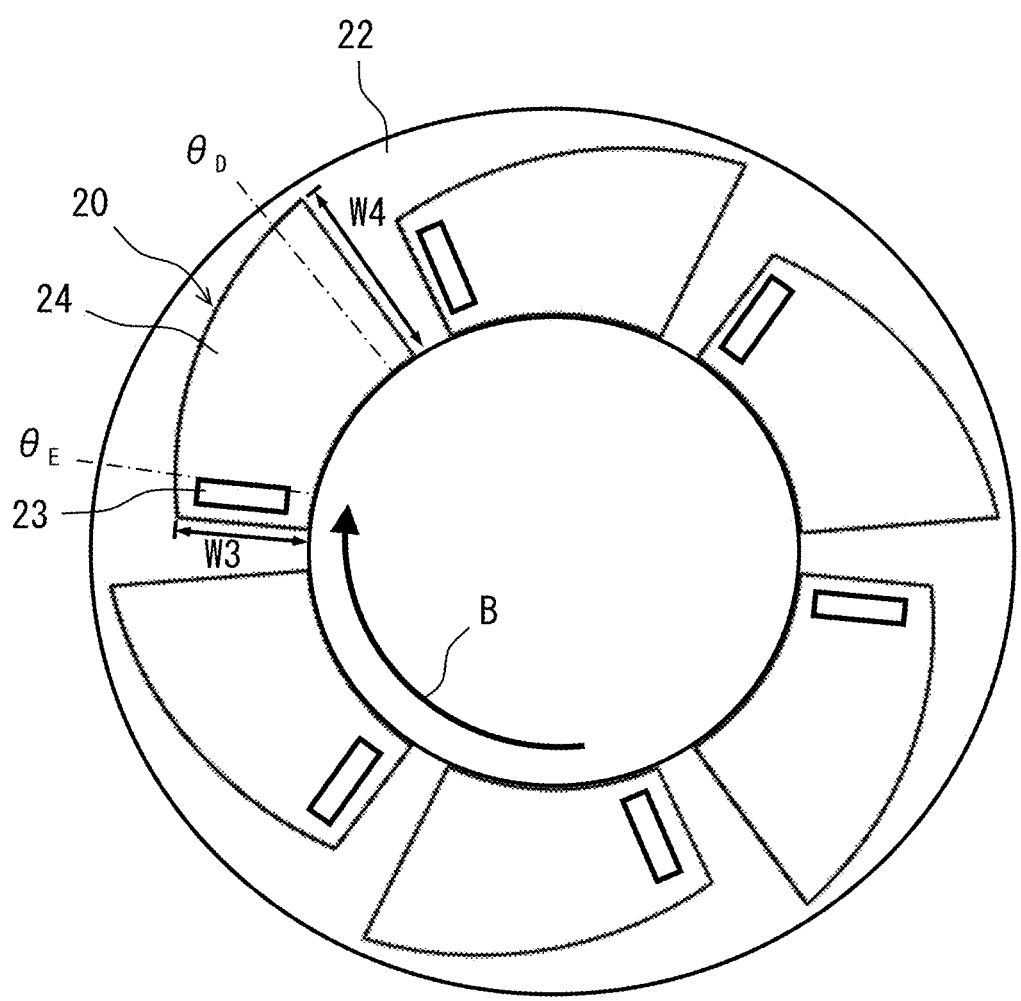
FIG. 11 is a circumferential cross-sectional view taken along section XI-XI in FIG. 10.

FIG. 10 is an axial cross-sectional view illustrating a structure of a tilting pad bearing according to the present embodiment. FIG. 11 is a circumferential cross-sectional view taken along section XI-XI in FIG. 10. Incidentally, although showing the rotational direction (arrow B) of a rotating shaft 1, the illustration of the rotating shaft 1 is omitted in FIG. 11.

The tilting pad bearing of the present embodiment is a thrust bearing which carries an axial load of the rotating shaft 1. This tilting pad bearing has a plurality of thrust pads 20 and a bearing housing 22. The plurality of thrust pads 20 are arranged in the circumferential direction of the rotating shaft 1 so as to face a runner portion 19 of the rotating shaft 1. The bearing housing 22 carries the plurality of thrust pads 20 in a tiltable manner via a plurality of corresponding pivots 21.

Each thrust pad 20 has a front end portion (i.e., a circumferentially upstream end portion) formed with an oil-feeding hole 23 passing therethrough in an axial direction. Lubricating oil is fed to a sliding surface 24 of the thrust pad 20 via the oil-feeding hole 23 of the thrust pad 20.

The Lubricating oil fed between the runner portion 19 of the rotating shaft 1 and the sliding surface 24 of the thrust pad 20 is rotated along with the rotating shaft 1 to form an oil film. The pressure of the oil film carries the rotating shaft 1. In this case, the thrust pad 20 tilts according to the pressure distribution of the oil film. Therefore, the thickness of the oil film formed between the runner portion 19 of the rotating shaft 1 and the sliding surface 24 of the thrust pad 20 gradually decreases as the thickness approaches the circumferential downstream side of the rotating shaft, (i.e., the rotational direction of the rotating shaft 1 indicated by arrow B in the figures). More specifically, although not shown, the thickness of the oil film becomes a maximum value at the leading edge of the sliding surface 24 of the thrust pad 20, gradually decreases as the thickness approaches the circumferential downstream side and then reaches a minimum value at a circumferential position $\theta=\theta_D$. Further, the thickness of the oil film slightly increases as the thickness approaches the trailing edge of the sliding surface 24.

As shown in FIG. 11, the sliding surface 24 of the thrust pad 20 of the present embodiment is such that the sliding surface has the radial width of W3 at the leading edge and the radial width of W4 at the trailing edge, which is larger than W3. (In short, W4>W3) The sliding surface 24 of the thrust pad 20 is formed so that the sliding surface has the radial width that gradually increases, as the radial width approaches the circumferential downstream side of the rotating shaft, from the leading edge to the trailing edge with the exception of the portion formed with the oil-feeding hole 23 positioned circumferentially. In other words, the sliding surface 24 of the thrust pad 20 has a portion so formed that the sliding surface has the radial width that gradually increases from an oil-feed start position (a circumferential position $\theta=\theta_E$) to feed the lubrication oil from the oil-feeding hole 23 onto the sliding surface 24 as the radial width approaches the circumferential downstream side of the rotating shaft. The function and effect of the present embodiment configured as above will be described in comparison with the conventional technology.

Figure 12:
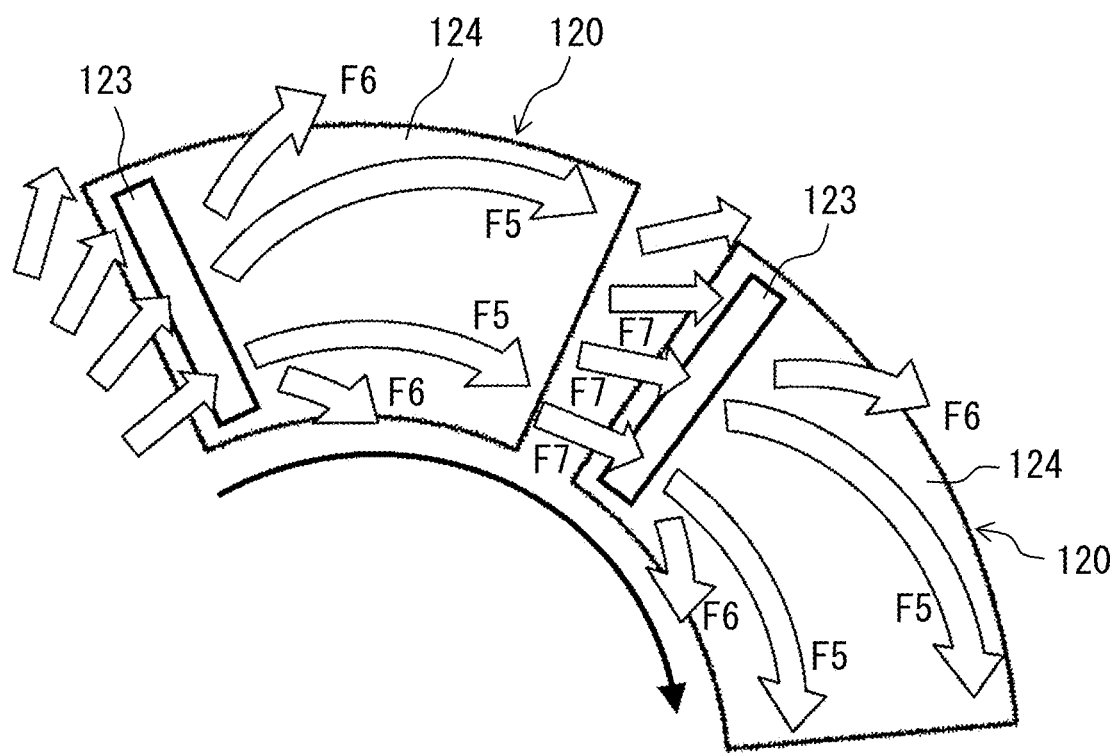
FIG. 12 illustrates the flow of oil on sliding surfaces of thrust pads according to a conventional technology.
Figure 13:
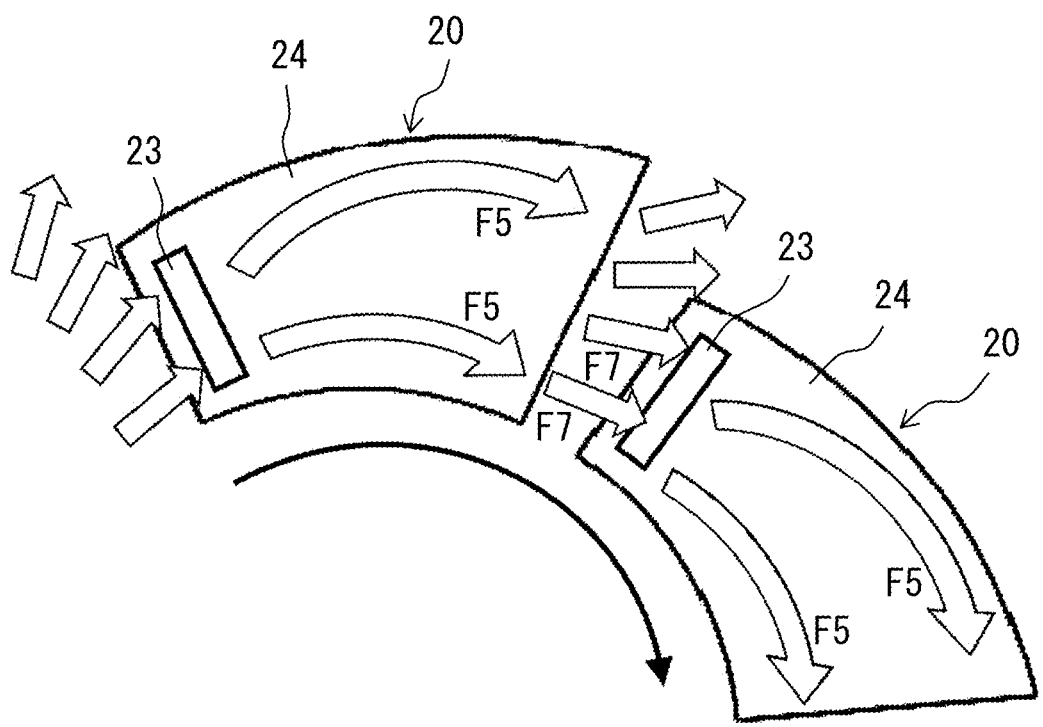
FIG. 13 illustrates the flow of oil on sliding surfaces of thrust pads according to the second embodiment of the present invention.

FIG. 12 illustrates the flow of oil on a sliding surface 124 of a thrust pad 120 according to a conventional technology. FIG. 13 illustrates the flow of oil on the sliding surface 24 of the thrust pad 20 according to the present embodiment.

The sliding surface 124 of the thrust pad 120 according to the conventional technology is formed so that the sliding surface has a radial width that is constant (e.g. W4) from the leading edge to the trailing edge thereof with the exception of the portion formed with oil-feeding hole 123 positioned circumferentially. In other words, the sliding surface 124 of the thrust pad 120 is formed such that the sliding surface has the radial width that is constant from an oil-feed start position at which lubrication oil is to be fed onto the sliding surface 124 from the oil-feeding hole 123, to the circumferential downstream trailing edge. Lubricating oil fed to the sliding surface 124 of the pad 120 from the oil-feeding hole 123 partially flows toward the trailing edge of the sliding surface 124 as indicated by arrows F5 in FIG. 12. However, the residual lubricating oil flows toward the side edges of the sliding surface 124 and leaks therefrom as indicated by arrows F6 in FIG. 12. More specifically, the thickness of an oil film gradually decreases as the thickness approaches the circumferential downstream side as described above. Therefore, also the sectional area of the oil film gradually decreases as the sectional area approaches the circumferential downstream side. The oil leaks from the side edges of the sliding surface 124 of the pad 120 in accordance with the decrease in the sectional area of the oil film. Thus, since the amount of oil leaking from the side edges of the sliding surface 124 of the pad 120 is not small, an amount of oil to be fed onto the sliding surface 124 of the pad 120 has to be increased in terms of this amount of leaking oil.

On the other hand, the sliding surface 24 of the trust pad 20 of the present embodiment is formed such that the sliding surface has the axial width that gradually increases, as the axial width approaches the circumferential downstream side of the rotating shaft, from the leading edge to the trailing edge with the exception of the portion formed with the oil-feeding hole 23 positioned circumferentially. In other words, the sliding surface 24 of the journal pad 20 has a portion so formed that the sliding surface has the radial width that gradually increases from the oil-feed start position to feed the lubrication oil from the oil-feeding hole 23 onto the sliding surface 24 as the radial width approaches the circumferential downstream side of the rotating shaft. In this way, the sectional area of the oil film does not decrease as the sectional area approaches the circumferential downstream side or the decrease in the sectional area of the oil film can be suppressed. Thus, the amount of oil leaking from the side edges of the sliding surface 24 of the pad 20 can be reduced. That is to say, most of the lubrication oil fed to the sliding surface 24 of the pad 20 from the oil-feeding hole 23 flows toward the trailing edge of the sliding surface 24 as indicated by arrows F5 in FIG. 13. Thus, while providing an intended oil film pressure, an amount of oil to be fed onto the sliding surface 24 of the pad 20 can be reduced.

The sliding surface 124 of the thrust pad 120 of the conventional technology is such that the sliding surface has the axial width of the leading edge that is the same as that of the trailing edge. Therefore, of high-temperature lubricating oil flowing out from the trailing edge of the sliding surface 124 of one thrust pad 120, a proportion of the lubricating oil (see arrows F7 in FIG. 12) flowing into the leading edge of the sliding surface 124 of the other thrust pad 120 is relatively large. Therefore, the temperature of the sliding surface 124 of the pad 120 tends to rise. Thus, an amount of oil to be fed onto the sliding surface 124 from the oil-feeding hole 123 has to be increased.

On the other hand, the sliding surface 24 of the thrust pad 20 of the present embodiment is such that the sliding surface has the radial width W3 at the leading edge, which is smaller than the radial width W4 at the trailing edge thereof. In particular, the radial outside of the leading edge portion of the sliding surface 24 is reduced in radial width. Therefore, of the high-temperature lubricating oil flowing out from the trailing edge of the sliding surface 24 of one thrust pad 20, a proportion of lubricating oil (see arrows F7 in FIG. 13) flowing into the leading edge of the sliding surface 24 of the other thrust pad 20 is relatively small. Therefore, a rise in temperature of the sliding surface 24 of the pad 20 can be suppressed. Thus, an amount of oil to be fed onto the sliding surface 24 from the oil-feeding hole 23 can be reduced.

Incidentally, the above second embodiment describes by way of example the case where the sliding surface 24 of the thrust pad 20 is formed so that the sliding surface has the radial width that gradually increases, as the radial width approaches the circumferential downstream side of the rotating shaft, from the leading edge to the trailing edge with the exception of the portion formed with the oil-feeding hole 23 positioned circumferentially. However, the present invention is not limited to this. The above second embodiment can be modified within a range not departing from the gist and technical concept of the present invention. That is to say, the sliding surface of the thrust pad needs only to have a portion so formed that the sliding surface has the radial width that gradually increases from the oil-feed start position (the circumferential position $\theta=\theta_E$) to feed the oil from the oil-feeding hole onto the sliding surface as the radial width approaches the circumferential downstream side of the rotating shaft. Therefore, for example, even if the portion formed with the oil-feeding hole positioned circumferentially is excluded, the radial width may not gradually increase, as the radial width approaches the circumferential downstream side of the rotating shaft, from the leading edge to the oil feed start position. For example, the sliding surface 24 of the thrust pad 20 may be formed so that the sliding surface has the radial width that gradually increases from the oil-feed start position to the position (the circumferential position $\theta=\theta_D$) at which the thickness of the oil film reaches the minimum value, as the radial width approaches the circumferential downstream side of the rotating shaft (in other words, the radial width may not increase from the position at which the thickness of the oil film reaches the minimum value, to the trailing edge). Although the effect of reducing the amount of leakage oil is reduced, the sliding surface of the thrust pad may be formed so that the sliding surface has the radial width that becomes the maximum at a position (however, preferably, a position on the circumferentially downstream side of the middle between the leading edge and the trailing edge) on the circumferential upstream side of the position at which the thickness of the oil film reaches the minimum value. Also these modified examples can reduce the amount of oil leaking from the side edges of the sliding surface of the pad. Thus, the amount of oil to be fed onto the sliding surface of the pad can be reduced compared with the conventional technology.

Figure 14:
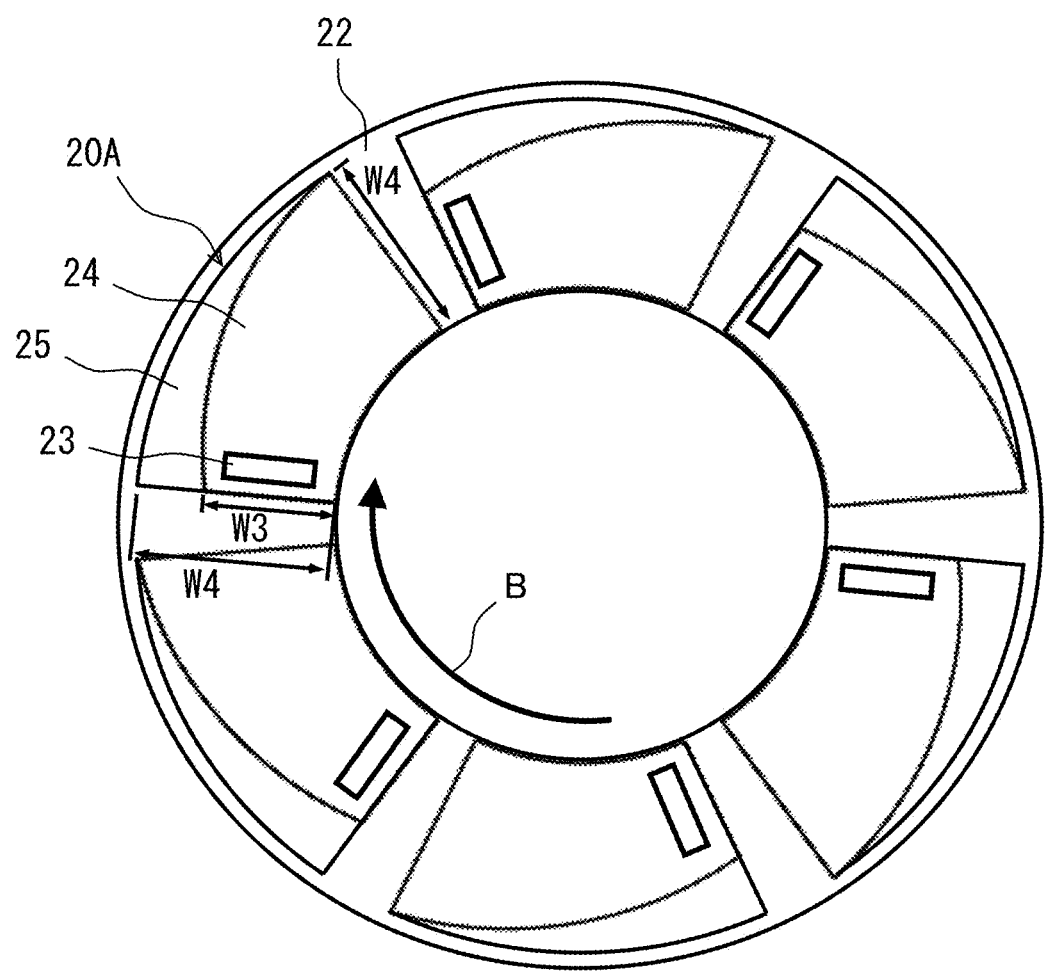
FIG. 14 is a circumferential cross-sectional view illustrating a structure of a tilting pad bearing according to a third modified example of the present invention.

The above second embodiment describes by way of example the case where the thrust pad 20 is configured so that the whole of the radial width gradually increases, as the radial width approaches the circumferential downstream side of the rotating shaft, from the circumferential upstream leading edge to the circumferential downstream trailing edge. However, the present invention is not limited to this. The second embodiment can be modified within a range not departing from the gist and technical concept of the present invention. That is to say, for example, a stepped surface 25 may be formed on the radial outside of a sliding surface 24 of a thrust pad 20A (specifically, the stepped surface 25 which is concaved from the sliding surface 24 and by which no oil film is formed between the runner portion 19 of the rotating shaft 1 and the stepped surfaces 25) as illustrated in FIG. 14. In addition, the thrust pad 20A may be configured so that the whole of the radial width thereof including the sliding surface 24 and the stepped surface 25 may be constant (W4) from the circumferentially upstream leading edge to the circumferentially downstream trailing edge. Also such a modified example can reduce the amount of oil leaking from the side edge of the sliding surface 24 of the pad 20A. Thus, the amount of oil to be fed onto the sliding surface 24 of the pad 20A can be reduced. The attachment performance of the pad 20A in the present comparative example becomes better compared with that of the second embodiment.

The above second embodiment describes by way of example the case where all the thrust pads 20 are formed with the respective oil-feeding holes 23 and lubricating oil is fed to the sliding surfaces 24 of the thrust pads 20 via the associated oil-feeding holes 23. However, the present invention is not limited to this. That is to say, for example, a tilting pad bearing that carries a horizontal rotating shaft 1 may be configured such that only a thrust pad 20 located on the underside of the rotating shaft 1 is formed with an oil-feeding hole 23 and lubricating oil is fed to the sliding surface of the thrust pad 20 via this oil-feeding hole 23. In this case, the features of the present invention may be adopted only for the sliding surface of the thrust pad 20 located on the underside of the rotating shaft 1. Also such a modified example can produce the same effects as above.

Figure 15:
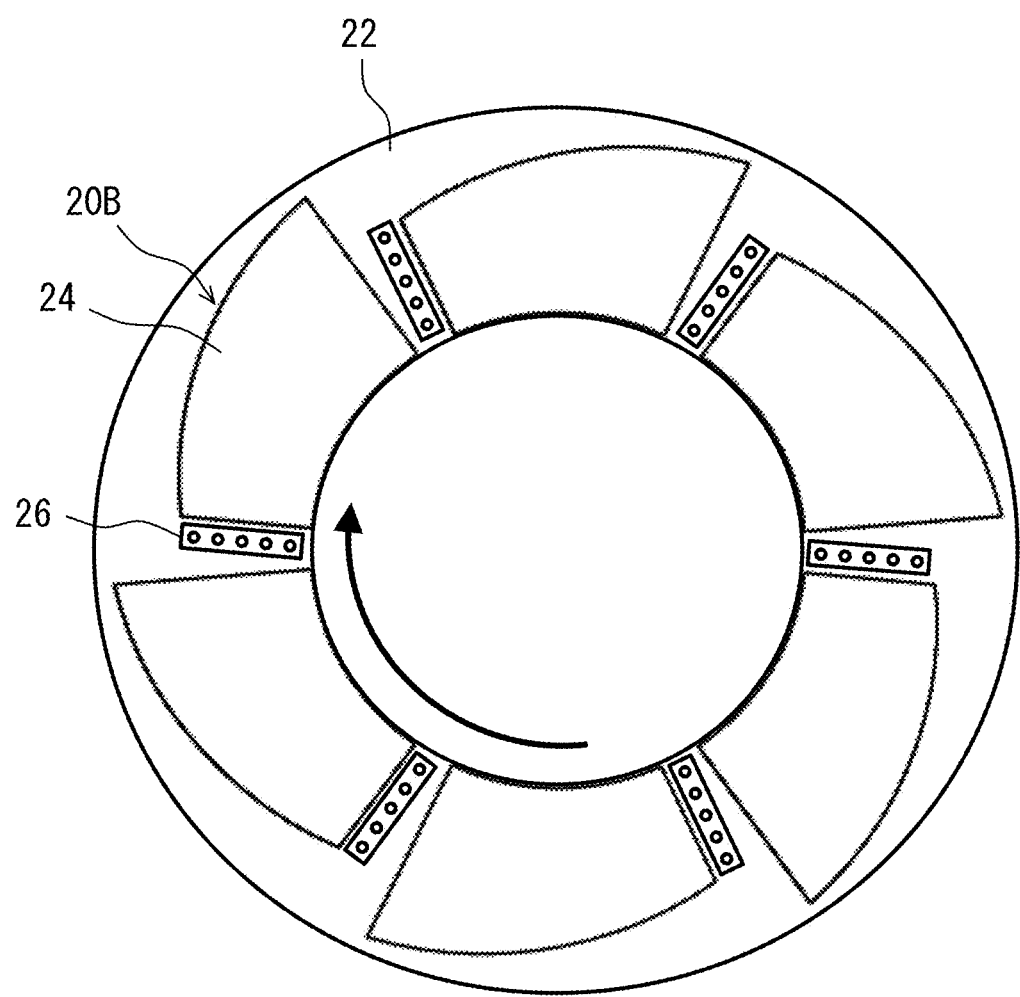
FIG. 15 is a circumferential cross-sectional view illustrating a structure of a tilting pad bearing according to a fourth modified example of the present invention.

The above second embodiment describes by way of example the case where lubricating oil is fed to the sliding surface of the thrust pad 20 via the oil-feeding hole 23 formed in the thrust pad 20. However, the present invention is not limited to this. The present invention may be applied to a configuration in which lubricating oil is fed to a sliding surface 24 of a thrust pad 20B via an oil-feed nozzle 26 provided between thrust pads 20B adjacent to each other as illustrated in FIG. 15. In this case, an oil-feed start position at which oil is to be fed onto the sliding surface 24 from the oil-feed nozzle 26 corresponds to the leading edge of the sliding surface 24. Therefore, the sliding surface 24 of the thrust pad 20B may have a portion so formed that the sliding surface has the radial width that gradually increases from the leading edge as the radial width approaches the circumferential downstream side of the rotating shaft. In one of specific examples, the sliding surface 24 of the thrust pad 20B illustrated in FIG. 15 is formed such that the sliding surface has the radial width that gradually increases as the radial width approaches the circumferential downstream side of the rotating shaft, from the leading edge to the trailing edge. Incidentally, jetting ports of the oil-feed nozzle 26 are arranged to correspond to the radial width of the leading edge of the thrust pad 20B. Also such a modified example can reduce an amount of oil leaking from the side edges of the sliding surface 24 of the pad 20B, so that the amount of oil to be fed onto the sliding surface 24 of the pad 20B can be reduced. In addition, the present modified example can increase the area of the sliding surface 24 in accordance with the area of an oil-feeding hole not formed. Thus, stability can be enhanced.

What is claimed is:

1. A tilting pad bearing, comprising:
  a plurality of journal pads arranged in a circumferential direction of a rotating shaft so as to face an outer circumferential surface of the rotating shaft; and
  a bearing housing for carrying the plurality of journal pads via a plurality of pivots in a tiltable manner;
  wherein lubricating oil is fed to a sliding surface of each of the journal pads via an oil-feeding hole formed in at least one of the journal pads or via an oil-feed nozzle disposed between at least a pair of the journal pads adjacent to each other; and
  wherein the sliding surface of each of the journal pads includes a portion having a center of the pad in the axial direction and so formed that an axial width of the portion gradually increases from an oil-feed start position to feed the lubricating oil from the oil-feeding hole or the oil-feed nozzle onto the sliding surface as the axial width approaches the circumferential downstream side of the rotating shaft.

2. The tilting pad bearing according to claim 1, wherein each of the journal pads is configured so that the whole of an axial width thereof including the sliding surface and a stepped surface is constant from a circumferential upstream leading edge to a circumferential downstream trailing edge.

3. The tilting pad bearing according to claim 1, wherein the sliding surface of each of the journal pads is formed so that the sliding surface has an axial width that gradually increases, as the axial width approaches the circumferential downstream side of the rotating shaft, from a circumferential upstream leading edge to a circumferential downstream trailing edge excluding a portion of the oil-feeding hole positioned circumferentially when the oil-feeding hole is formed.

4. A tilting pad bearing, comprising:
  a plurality of thrust pads arranged in a circumferential direction of a rotating shaft so as to face a runner portion of the rotating shaft; and
  a bearing housing for carrying the plurality of thrust pads in a tiltable manner via a plurality of pivots;
  wherein lubricating oil is fed to a sliding surface of each of the thrust pads via an oil-feeding hole formed in at least one of the thrust pads or via an oil-feed nozzle disposed between at least a pair of the thrust pads adjacent to each other; and
  wherein the sliding surface of each of the thrust pads includes a portion having a center of the pad in the radial direction and so formed that a radial width of the portion gradually increases from an oil-feed start position to feed the lubricating oil from the oil-feeding hole or the oil-feed nozzle onto the sliding surface as the radial width approaches the circumferential downstream side of the rotating shaft.

5. The tilting pad bearing according to claim 4, wherein each of the thrust pads is formed so that the whole of a radial width thereof including the sliding surface and a stepped surface is constant from a circumferential upstream leading edge to a circumferential downstream trailing edge.

6. The tilting pad bearing according to claim 4, wherein the sliding surface of each of the thrust pads is formed so that the sliding surface has a radial width that gradually increases, as the radial width approaches the circumferential downstream side of the rotating shaft, from a circumferential upstream leading edge to a circumferential downstream trailing edge excluding a portion of the oil-feeding hole positioned circumferentially when the oil-feeding hole is formed.

* * * * *